UNITED STATES PATENT OFFICE.

CARL DREHER, OF NIEDER INGELHEIM, GERMANY, ASSIGNOR TO C. H. BOEHRINGER SOHN, OF SAME PLACE.

PROCESS OF MORDANTING WOOL.

SPECIFICATION forming part of Letters Patent No. 597,401, dated January 18, 1898.

Application filed September 1, 1896. Serial No. 604,576. (No specimens.)

*To all whom it may concern:*

Be it known that I, CARL DREHER, chemist, doctor of philosophy, residing at Nieder Ingelheim-on-the-Rhine, Germany, have invented new and useful Improvements in the Process of Mordanting Wool and other Animal Fibers, of which the following is a specification.

A process for mordanting wool prior to dyeing by chromates, together with lactic acid in place of tartar or of oxalic acid, has been known for some time. However, the results obtained thereby have differed greatly and were mostly unfavorable to the lactic-acid process.

By the new process the following new results have been obtained: The mordanting lye is completely exhausted—viz., all the chromium is precipitated, the wool is mordanted in a clear green shade and in the most suitable manner for the subsequent dyeing. Formerly where lactic acid was used it was manipulated in almost precisely the same manner as tartar and oxalic acid, no regard being had to the special chemical qualities of the new acid. My discoveries relating hereto have shown that lactic acid acts quite differently from the old mordants in presence of chromates. First, lactic acid is much more easily attacked by the oxid of chromium than the other agents, which decompose at ordinary temperature, while tartar and oxalic acid require boiling heat. I have found, further, by my experiments that the process of oxidation may easily be conducted in such a manner that lactic acid is decomposed in aldehyde and carbonic acid, all chromate being at the same time reduced to oxid of chromium and deposited as a green precipitate. This, for instance, is the case if the following mixture is slightly heated and afterward boiled for about an hour: five grams lactic acid, fifty per cent.; three grams bichromate of potash, and 0.5 grams sulfuric acid, dissolved in two hundred cubic centimeters of water. However, a surplus of bichromate, as well as one of acids, produces another result. In the first case the liquid remains yellow from the unaltered bichromates, and in the second case the oxid of chromium may be dissolved again by these acids in form of green salts. Tartar and oxalic acid, however, never reduce all the bichromate and can never precipitate oxid of chromium, the surplus of acids always maintaining the reduced products dissolved as a yellow solution of a more or less greenish shade. This process of oxidation causing the complete reduction of all the bichromate may easily be applied with successful results not obtained hitherto in mordanting wool, the proportions mentioned before being only slightly modified, the operation being carried on in a more diluted solution and the wool showing a basic character. For instance, for a perfect result the process may be carried out in the following manner: One hundred kilos of wool cleaned as usual and previously moistened are treated for half an hour at 160° Fahrenheit in a bath of two thousand liters of water containing (A) 2.65 kilos lactic acid, fifty per cent.; 1.35 kilos bichromate of potash, and 0.90 kilo sulfuric acid, being slowly heated to the boiling, and thus continuing for half an hour. The wool appearing yellow at the beginning slowly turns green. The liquid at first appearing yellow is quite colorless at the end. This splendid result, however, is only obtained if the above conditions are observed. Neither a surplus of bichromates nor of acids can furnish the same result. On the contrary, in any other way very bad results are obtained. This is the case, for instance, when a surplus of bichromate is used for mordanting, say, (B) three kilos bichromate of potash and 2.5 kilos lactic acid, a proportion mostly used thus far and corresponding with the tartar method. The wool so mordanted is quite yellowish and the liquid also of a decided yellow. The wool and the liquid still appear yellowish, but less when the proportions indicated above in the first place (A) are employed, omitting the sulfuric acid, (C) 2.65 kilos lactic acid, 1.35 kilos bichromate of potash.

The desired perfect result yielded by the new operation can therefore only be obtained if there is neither a surplus of bichromates nor of acids, the latter maintaining a part of oxid of chromium dissolved in the liquid, which then appears greenish and acts less on the wool. It is also necessary that all trioxid of chromium be freed from the salt by the acids. For the last purpose it is of course best and most profitable to use sulfuric acid, a small quantity of it acting just as strongly as a much greater quantity of expensive organic acids—for instance, 0.9 kilo sulfuric acid is equal to 2.5 kilos lactic acid—and the lactic acid already employed being quite sufficient for the complete reduction of the trioxid of chromium.

Other mineral acids, as muriatic acid and nitric acid, are not profitable, because they may cause still additional reactions on the wool and the mordants in contrast to sulfuric acid.

The advantages resulting from the new mordanting process are—

First. A great saving of chrome.

Second. The shades are purer and faster in every respect, as against scouring, milling, light, and air. As is known, the combinations of pure oxid of chromium with dyestuffs are superior in every respect to combinations of the latter with chromates and intermediate products of these, which are to be found on wool mordanted yellowish. These intermediate products may also cause alterations of some colors. (Logwood color, for instance, soon becomes green in this case.)

Third. The fiber remains much softer and more brilliant and is less spoiled than in other cases. The wool is only charged with pure oxid of chromium and only with the quantity of mordant necessary for dyeing, without any other useless products, and is not boiled so long as in other cases.

Fourth. The process is easily controlled and a great regularity of the shades obtained.

The end of the operation is easily apparent, as the liquid is quite discolored by the complete exhaustion of the mordanting lye. The wool is always mordanted quite regularly and to the same degree, whereas in other processes, where the mordanting lyes are not exhausted, the duration of the process and the extension of the bath influence the result.

By the new mordanting operation the difficult and troublesome correction of the shades, particularly in dyeing with alizarins, may be avoided.

Now what I claim, and desire to secure by Letters Patent, is the following:

1. The process of mordanting wool and other animal fibers which consists in treating the same with compounds of chromium and freeing the acids of chromium by sulfuric acid and reducing the said acids to oxid of chromium by lactic acid, substantially as described.

2. The herein-described process of mordanting wool and other animal fibers which consists in treating the same with a lye comprising lactic acid, bichromate of potash and sulfuric acid in about the following proportions, to wit: 2.65 kilos lactic acid, 1.35 kilos bichromate of potash, 0.9 kilo sulfuric acid, thereby yielding a complete reduction of the potassium bichromate, as specified.

In testimony whereof I have signed my name to this specification in the presence of two subscribing witnesses.

CARL DREHER.

Witnesses:
RICHARD WIRTH,
CARL ROTH.